United States Patent
Barel (10) Patent No.: US 12,429,951 B1
(45) Date of Patent: Sep. 30, 2025

(54) TOUCH SURFACE FORCE DETERMINATION

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/621,703

(22) Filed: Mar. 29, 2024

(51) Int. Cl.
G06F 3/0354 (2013.01)
G06F 3/01 (2006.01)
G06F 3/041 (2006.01)
G06F 3/044 (2006.01)

(52) U.S. Cl.
CPC .......... G06F 3/016 (2013.01); G06F 3/03547 (2013.01); G06F 3/044 (2013.01); G06F 2203/013 (2013.01); G06F 2203/0381 (2013.01); G06F 2203/04105 (2013.01)

(58) Field of Classification Search
CPC ...... G06F 3/016; G06F 3/03547; G06F 3/044; G06F 2203/013; G06F 2203/015; G06F 2203/014; G06F 2203/0381; G06F 2203/04105
See application file for complete search history.

(56) References Cited

U.S. PATENT DOCUMENTS

| | | | |
|---|---|---|---|
| 9,690,426 B1 | 6/2017 | Eichwald | |
| 11,687,160 B2 * | 6/2023 | Zhao | G06F 3/038 345/157 |
| 11,768,542 B1 * | 9/2023 | Dani | G06F 3/0416 345/174 |
| 12,229,378 B1 * | 2/2025 | Barel | G06F 3/0447 |
| 2008/0024459 A1 * | 1/2008 | Poupyrev | G06F 3/0488 345/173 |
| 2011/0012869 A1 | 1/2011 | Klinghult | |
| 2011/0227872 A1 * | 9/2011 | Huska | G06F 3/016 345/174 |
| 2013/0342469 A1 * | 12/2013 | Keeney | G06F 1/1694 345/173 |
| 2016/0179245 A1 * | 6/2016 | Johansson | G06F 3/0447 345/174 |
| 2017/0336891 A1 * | 11/2017 | Rosenberg | G06F 3/04144 |
| 2018/0095596 A1 | 4/2018 | Turgeman | |
| 2020/0150767 A1 * | 5/2020 | Karimi Eskandary | H04M 1/0202 |

FOREIGN PATENT DOCUMENTS

KR  20090127544 A  12/2009

* cited by examiner

Primary Examiner — Julie Anne Watko
(74) Attorney, Agent, or Firm — Alleman Hall & Tuttle LLP (57) ABSTRACT

Computing devices and methods for determining a force applied to a user input device are disclosed. In one example, a computing device comprises a user input device comprising a touch surface, a haptic actuator coupled to the touch surface, and an accelerometer coupled to the touch surface. The computing device receives a touch input from the touch surface and drives the haptic actuator with a force detection driving signal to cause an acceleration in the touch surface. The computing device measures the acceleration using a signal from the accelerometer and uses at least the acceleration to determine a force of the touch input on the touch surface.

20 Claims, 7 Drawing Sheets

TOUCH SURFACE FORCE DETERMINATION

BACKGROUND

Some user input devices include a touch-sensitive surface for receiving user inputs. These devices can also include haptic components that are configured to generate vibrations in the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to methods and computing devices for determining the force of a touch input on a touch surface of a user input device, such as a trackpad. In some examples, a computing device comprises a user input device that includes a touch surface and a haptic actuator and accelerometer coupled directly or indirectly to the touch surface. The computing device receives a touch input from the touch surface and drives the haptic actuator with a force detection driving signal to cause an acceleration in the touch surface. Using a signal from the accelerometer, the acceleration is measured and a force of the touch input on the touch surface of the user input device is determined.

As described in more detail below, and in one potential advantage of the present disclosure, this configuration of measuring and utilizing touch surface accelerations to determine the force of a touch input on a touch surface of the user input device can eliminate the need for additional force-measuring components, such as capacitive force sensors and strain gauges, thereby increasing available packaging space in the user input device and correspondingly reducing manufacturing costs. Additionally, in some user input devices that include dedicated force-measuring components, aspects of the present disclosure can compliment and enhance force determinations and other aspects of these devices.

DETAILED DESCRIPTION

Some computing devices include or can be communicatively coupled to a user input device, such as a trackpad, joystick, mouse, handheld controller, etc., for receiving user inputs via touch contact. These user input devices can include dedicated components for determining the force applied by a touch contact. For example, some trackpads include strain gauge(s) or pairs of capacitive force-sensing electrodes that function to estimate a force applied to the trackpad. However, including these additional components within the user input device occupies valuable packaging space within the user input device, adds additional design and engineering constraints to potential locations and configurations of other components, and creates additional potential reliability issues. Further, these additional components increase manufacturing costs of the user input devices.

Some user input devices include one or more haptic components that are configured to generate vibrations in the device. For example, in some trackpads one or more conductive coils, linear resonant actuators (LRAs), or other haptic components are coupled to the trackpad and configured to vibrate the trackpad to provide haptic feedback to a user.

As described in more detail below, configurations of the present disclosure provide computing devices and methods for determining a force of a touch input on a touch surface of a user input device comprising haptic feedback components. Advantageously and as described further below, by actuating a haptic actuator and measuring the resulting acceleration using signals from an integrated accelerometer(s), computing devices of the present disclosure can determine a force of a touch input without the use of additional force-detecting components, such as strain gauges or capacitive electrodes. In this manner and as noted above, configurations of the present disclosure can determine touch input forces without additional force-measuring components, such as capacitive force sensors and strain gauges, thereby increasing available packaging space and correspondingly reducing manufacturing costs. Additionally, in user input devices that include other force-measuring components, the present configurations can complement and enhance the force determinations and other aspects of these devices.

With reference now to FIGS. 1-4 and 6-8, an example computing device 100 in the form of a laptop computer is illustrated. In other examples, aspects of the present disclosure can be implemented in tablet computing devices, foldable computing devices, wearable and other mobile computing devices, and any other type of computing device that utilizes a haptic user input device. In some examples, aspects of the present disclosure can be implemented in standalone haptic user input devices, such as keyboards that include haptic trackpads, joysticks, handheld game/application controllers, and pointing devices such as mice.

Figure 1:
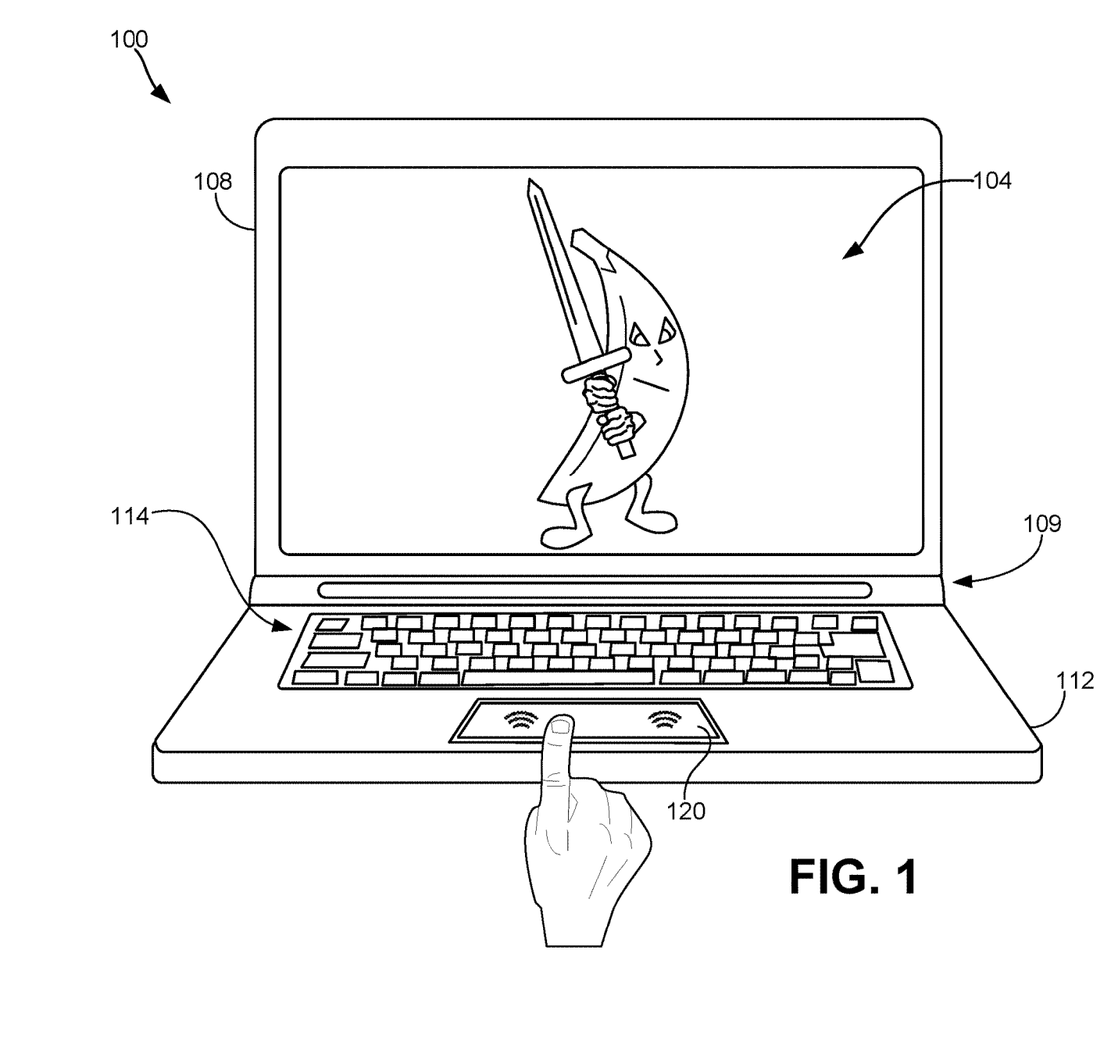
FIG. 1 shows one example of a computing device with a haptic trackpad according to examples of the present disclosure.

Computing device 100 includes a display 104 on a display substrate 108 that is rotatably coupled at a hinge 109 to a chassis 112. The chassis 112 includes a user input device in the form of trackpad 120 and a keyboard 114 mounted therein. In different examples a user provides touch inputs to the trackpad 120 by touching the trackpad with one or more digits of the user's hand. As described in more detail below, trackpad 120 includes a haptic actuator 124 and an accelerometer 126 (see FIG. 2) that measures actual trackpad accelerations created by the haptic actuator. In one potential advantage of the present disclosure, by actuating the haptic actuator and measuring the acceleration using signals from the accelerometer, computing device 100 can determine a force of a touch input without the use of additional force-detecting components.

Trackpad 120 is configured to detect the position and movement of a user's finger(s), thumb, and/or limb and translate such position/movement to a relative position on display 104. In some examples, the trackpad 120 performs such touch detection using mutual capacitance techniques. In these examples, touch inputs are identified by sampling capacitance between a driving electrode and a sensing electrode. Driving electrodes are arranged in an array within the trackpad 120. Touch detection signals are provided to each of the electrodes at a different frequency and/or at a different time. Grounded conductive materials, such as a user's finger, draw electric field lines away from sensing electrodes when providing a touch input. This results in a lower capacitive coupling between driving and sensing electrodes. Such lower capacitive coupling is measured by a touch sensing processor as a lower current flow from the driving electrode to sensing electrode. A location of the touch input can be reconstructed based at least in part on determining which driving electrodes were being driven when the touch input occurred, and the frequency of the touch detection signal driving each driving electrode. In other examples, the principles of the present disclosure may be utilized with trackpads employing other touch detection technologies, including but not limited to self-capacitance and projected capacitance touch detection.

Figure 2:
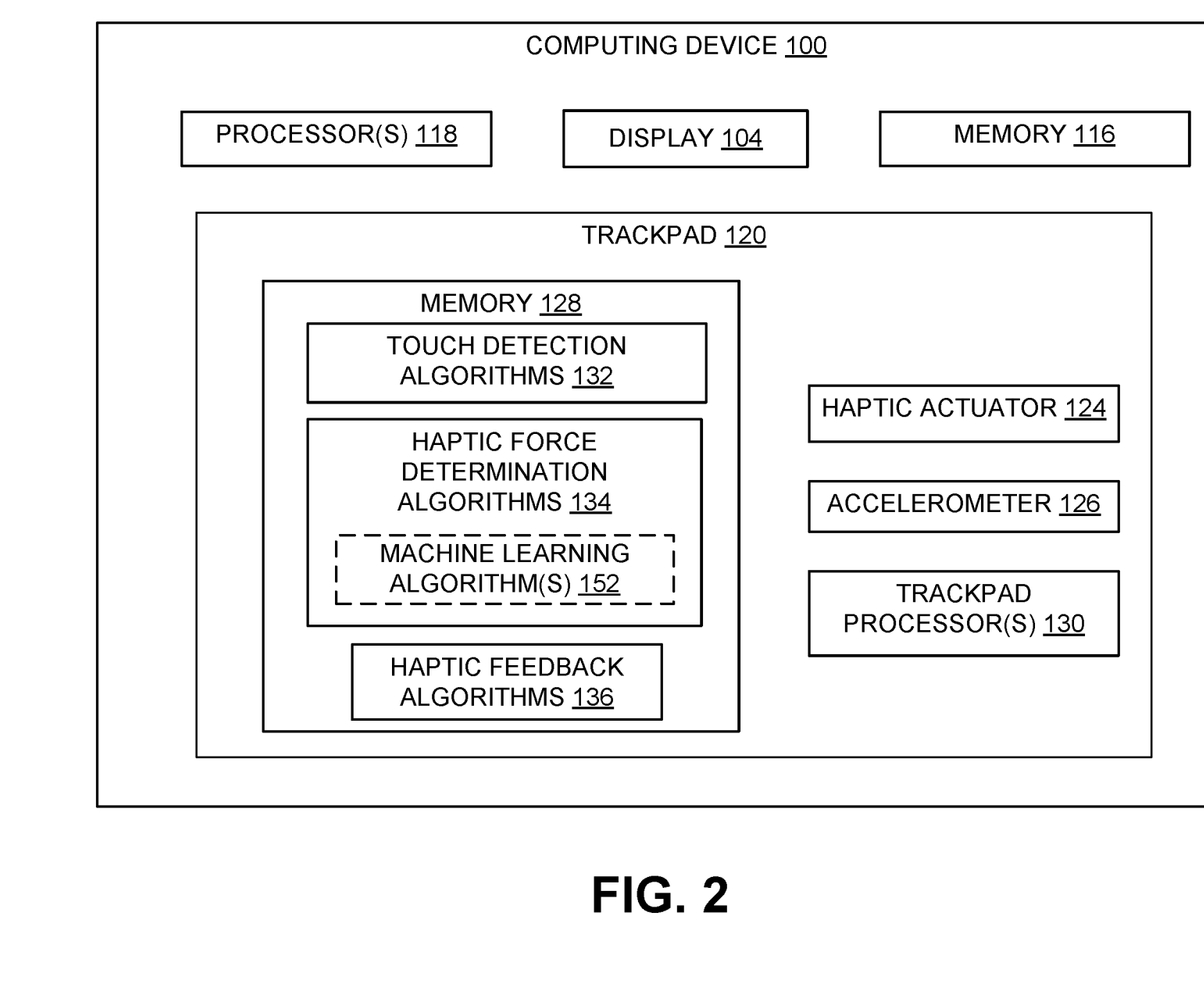
FIG. 2 shows a schematic view of components of the computing device of FIG. 1 according to examples of the present disclosure.

With reference now to FIG. 2, a schematic view of components of one example of the computing device of FIG. 1 is provided. Computing device 100 includes memory 116 that stores instructions executable by a processor 118. Such instructions can include an operating system and one or more applications. In the present example, trackpad 120 comprises a trackpad memory 128 that stores instructions executable by a trackpad processor 130. For example, the trackpad memory 128 stores instructions in the form of touch detection algorithms 132 executable by the trackpad processor 130 to perform touch detection on the trackpad 120 using signals received from the trackpad.

Additionally, and as described in more detail below, trackpad memory 128 stores instructions in the form of haptic force determination algorithms 134 executable by the trackpad processor 130 to drive the haptic actuator 124 with a force detection driving signal, receive and process corresponding signals from the accelerometer 126 to measure the resulting acceleration in the touch surface of trackpad 120, and use at least the acceleration to determine a force of the touch input on the touch surface of the trackpad. As described further below, memory 128 also stores instructions in the form of haptic feedback algorithms 136 that are executable to drive the haptic actuator 124 with a haptic feedback driving signal for providing haptic feedback to a user.

In some examples, one or more of the touch detection algorithms 132, haptic force determination algorithms 134, and haptic feedback algorithms 136 are stored in memory 116 and executed by processor(s) 118 of computing device 100. In some examples, the trackpad 120 includes the haptic actuator 124 and accelerometer 126 and does not include a dedicated memory or processor. Additional details regarding processor(s) 118, trackpad processor(s) 130, memory 116, trackpad memory 128, and other components and subsystems of computing device 100 and trackpad 120 are described further below with reference to FIG. 8.

Figure 3:
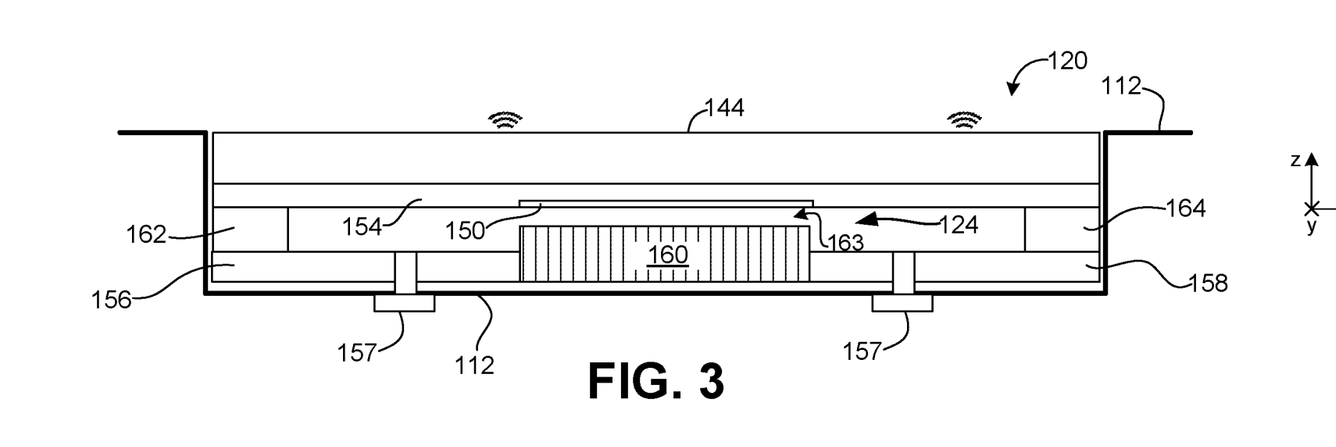
FIG. 3 shows a schematic view of components of the trackpad and haptic actuator of the computing device of FIG. 1 according to examples of the present disclosure.
Figure 4:
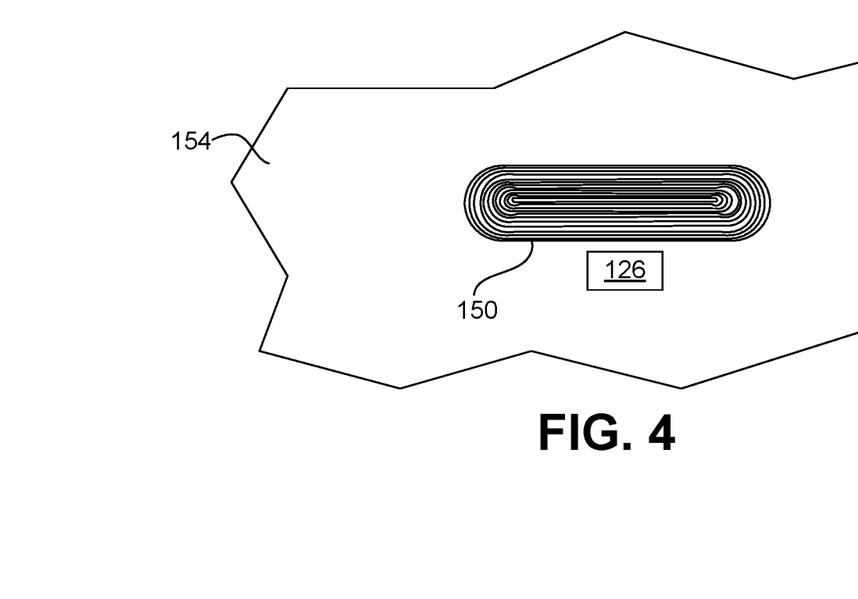
FIG. 4 shows a partial schematic view of a conductive coil located in a printed circuit board of the haptic actuator of FIG. 3 according to examples of the present disclosure.

In some configurations of the present disclosure, the haptic actuator 124 comprises one or more conductive coils formed on or affixed to a printed circuit board of the trackpad, and one or more magnets mounted adjacent to the conductive coil(s). With reference now to FIGS. 3 and 4, in one example the trackpad 120 includes a touch surface 144, such as a glass layer. Beneath the touch surface 144 is a printed circuit board 154 comprising driving and sensing electrodes as described above.

In this example, the printed circuit board 154 is affixed to a first mounting plate 156 and second mounting plate 158 via a first spacer 162 and second spacer 164, respectively. In some examples, the first spacer 162 and second spacer 164 comprise a resilient, dampening material to mechanically isolate the trackpad 120 and dissipate the transmission of forces and other mechanical energy between the trackpad 120 and the chassis 112. For example, the first spacer 162 and second spacer 164 may comprise an elastomeric material, such as rubber or any other suitable material. The first mounting plate 156 and second mounting plate 158 are coupled to the chassis 112 by fasteners 157, such as screws.

With reference also to FIG. 4, the haptic actuator 124 comprises a conductive coil 150 that is formed on printed circuit board 154. In other examples, the conductive coil 150 may be a discrete coil module that is affixed to the surface of the printed circuit board 154. In other examples, two or more conductive coils may be utilized. In the present example, the accelerometer 126 is affixed to the printed circuit board 154 adjacent to the conductive coil 150. In other examples, the accelerometer 126 may be located at any other suitable location on printed circuit board 154. In some examples, the accelerometer may be one component of an inertial measurement unit that includes a gyroscope and/or magnetometer. In other examples of user input devices, an accelerometer can be spaced from and mechanically coupled to the touch surface via one or more other components, such as a chassis, enclosure, handle, or other suitable surface.

The conductive coil 150 is formed of a conductive material. Examples of conductive materials include various metals, such as aluminum, gold, silver, and copper. The conductive coil 150 in this example is planar in structure and relatively thin as compared to its length and width to provide a relatively flat structure. In the present example, the conductive coil 150 is formed by a conductive line tracing a planar spiral pattern with a progressively larger distance from the center portion of the coil to its outer edge.

The conductive coil(s) can be formed on the printed circuit board 154 in any suitable method, such as a masking technique, via deposition and etching of a conductive film on the printed circuit board, or via 3-dimensional printing techniques. In other examples, a pre-formed conductive coil can be affixed to the printed circuit board 154 by any suitable method, including gluing.

As shown in FIG. 3, in this example the haptic actuator 124 includes a magnet 160 that is affixed to the first mounting plate 156 and second mounting plate 158. In this example, magnet 160 is spaced from the conductive coil 150 to form a gap 163 between the magnet and the coil. In this configuration, driving signals generated by the haptic force determination algorithms 134 or haptic feedback algorithms 136 are provided to the conductive coil 150. The driving signals are controlled to generate electromagnetic fields that exert magnetic forces on the magnet 160 and corresponding forces on the conductive coil 150 and attached printed circuit board 154 and touch surface 144 of the trackpad 120. More particularly, in this example Lorentz forces operate to vibrate the touch surface 144 laterally in the x-y plane and thereby cause accelerations in the touch surface.

Figure 5A:
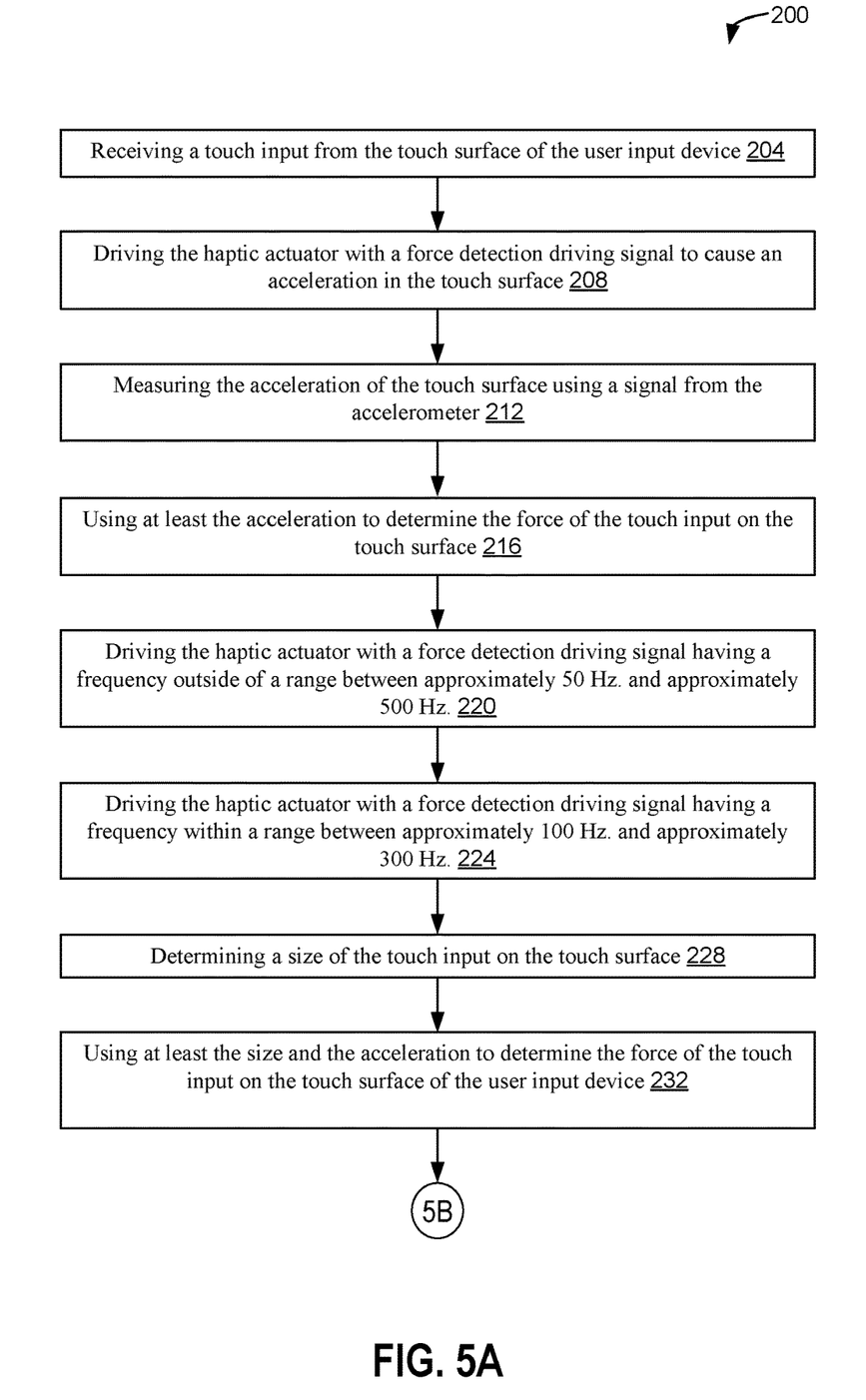
FIGS. 5A and 5B show a flow diagram of an example method for determining a force of a touch input on a touch surface of a user input device according to examples of the present disclosure.
Figure 5B:
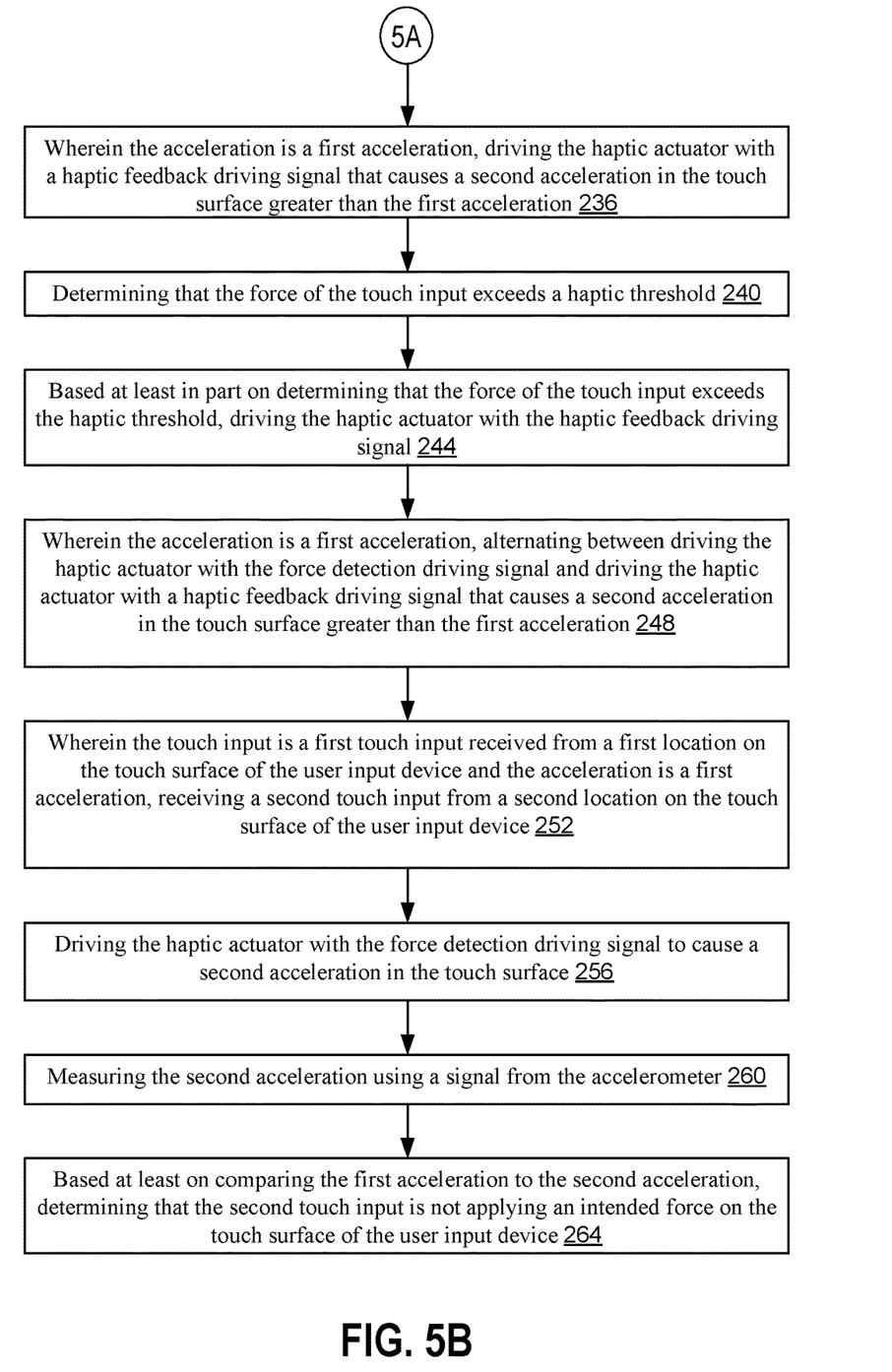

As noted above and described further below, configurations of the present disclosure utilize signals from the integrated accelerometer 126 to determine a force of a touch input on the touch surface 144 of the trackpad 120. With reference now to FIGS. 5A and 5B, an example method 200 for determining a force of a touch input on a touch surface of a user input device comprising an accelerometer will now be described. FIGS. 5A and 5B depict a flowchart illustrating method 200. The following description of method 200 is provided with reference to the software and hardware components described herein and shown in FIGS. 1-4 and 6-8. For example, method 200 may be performed by the computing device 100, hardware, software, and/or firmware of the computing device 100.

It will be appreciated that the following description of method 200 is provided by way of example and is not meant to be limiting. Therefore, it is to be understood that method 200 may include additional and/or alternative steps relative to those illustrated in FIGS. 5A and 5B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in a variety of other computing devices having different form factors, components, and/or capabilities, and in other contexts using other suitable components.

Figure 6:
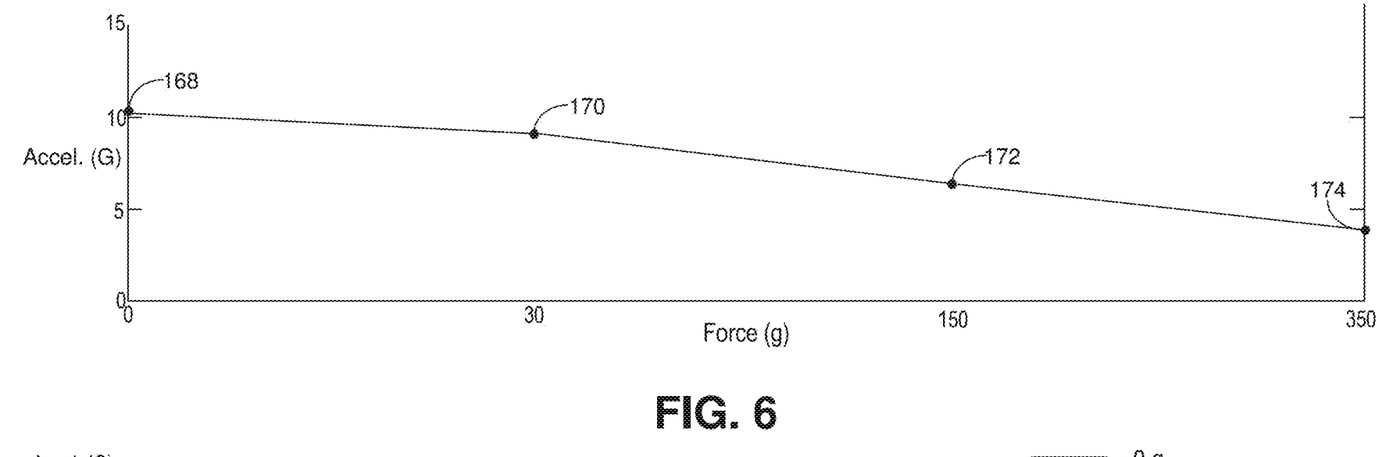
FIG. 6 shows a graph of peak accelerations of a touch surface resulting from driving a haptic actuator with a force detection driving signal for different magnitudes of touch force applied to the touch surface according to examples of the present disclosure.

With reference to FIG. 5A, at 204 method 200 includes receiving a touch input from the touch surface 144 of the user input device. In the present example and in different use case examples, touch inputs can produce different magnitudes of force on the touch surface 144 of trackpad 120. Additionally, it has been discovered that as the magnitude of the touch input increases, the maximum acceleration of the touch surface 144 correspondingly decreases. With reference now to FIG. 6, this graph shows one example of a driving signal applied to the haptic actuator 124 with different forces of touch inputs applied to the touch surface. In this example at 168, where no force is applied to the touch surface 144, the peak acceleration of the touch surface is 10.2 G. At 170 where a touch input applies 30 grams of force to the touch surface 144, the peak acceleration of the touch surface is 9.0 G. At 172 where a touch input applies 150 grams of force to the touch surface 144, the peak acceleration of the touch surface is 6.4 G. At 174 where a touch input applies 350 grams of force to the touch surface 144, the peak acceleration of the touch surface is 3.8 G.

Figure 7:
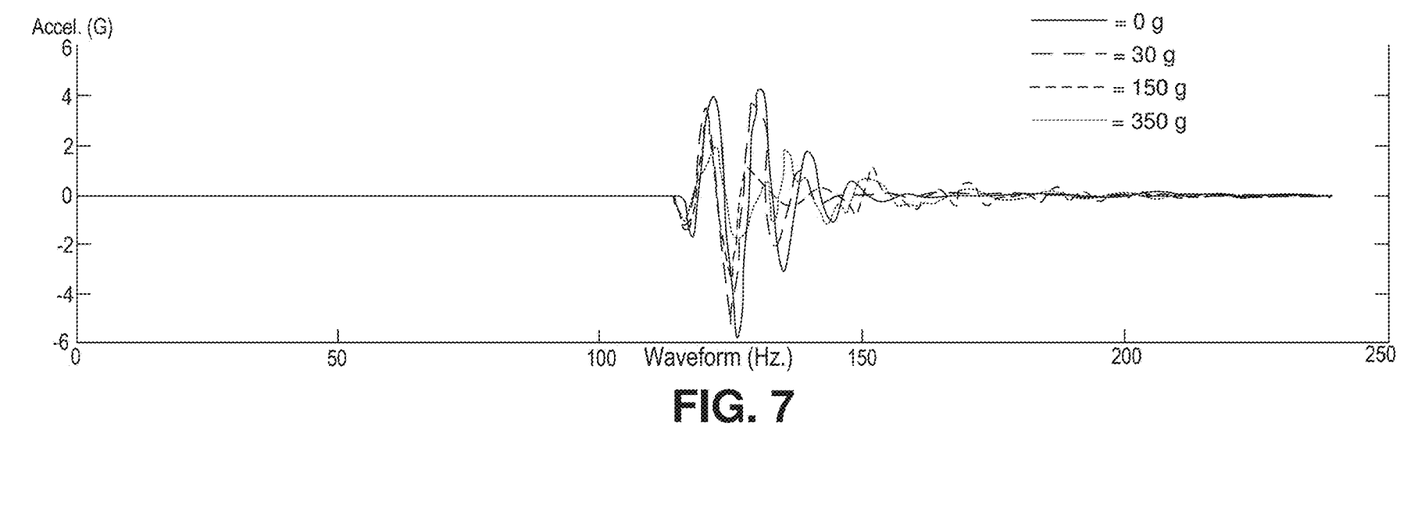
FIG. 7 shows a graph of different waveforms and accelerations of a touch surface resulting from driving a haptic actuator with a force detection driving signal for different magnitudes of touch force applied to the touch surface according to examples of the present disclosure.

In a similar manner, the waveform of the vibrating touch surface 144 will exhibit different peak-to-peak acceleration values for different magnitudes of force of touch inputs. FIG. 7 shows a graph of different waveforms and peak-to-peak accelerations of touch surface 144 resulting from driving haptic actuator 124 with a force detection driving signal for different magnitudes of touch force applied to the touch surface. In this example, waveforms for touch force magnitudes of 0 g, 30 g, 150 g, and 350 g. are illustrated. Accordingly, as described in more detail below and in one potential advantage of the present disclosure, by driving the haptic actuator 124 with a force detection driving signal and measuring the corresponding acceleration of the touch surface 144, the measured acceleration can be used to determine the force of the touch input on the touch surface.

Returning to FIG. 5A, at 208 method 200 includes driving the haptic actuator 124 with a force detection driving signal to cause an acceleration in the touch surface. In different examples and for different use case requirements, the force detection driving signal can have different properties and shapes. For example, the force detection driving signal can be a sinusoidal waveform or non-sinusoidal waveform, such as a square wave, sawtooth wave, or other suitable waveform.

At 212 method 200 includes measuring the acceleration of the touch surface using a signal from the accelerometer. In one example, the haptic force determination algorithms 134 measure the peak-to-peak acceleration of the touch surface 144. At 216 method 200 includes using at least the acceleration to determine the force of the touch input on the touch surface 144. In some examples, the haptic force determination algorithms 134 can utilize a look-up table that maps a plurality of acceleration values to corresponding forces of a touch input. In other examples, one or more linear equations can be utilized to translate an acceleration value to a force of a touch input. In some examples, the haptic force determination algorithms 134 can optionally include one or more machine learning algorithms 152 that map a measured acceleration of the touch surface 144 to a touch force value using one or more models that are trained with actual touch forces of multiple touch inputs received over time and their corresponding resulting accelerations as measured by the accelerometer 126. In different examples, a variety of machine learning algorithms can be utilized, such as one or more neural networks, according to different trackpad and computing device design considerations and different force measurement requirements.

As noted above, and in one potential advantage of the present disclosure, by measuring and utilizing touch surface accelerations to determine the force of a touch input on a touch surface of the trackpad, configurations of the present disclosure can eliminate the need for capacitive force sensors, strain gauges, and other discrete force-sensing components, thereby saving valuable packaging space in the trackpad and reducing manufacturing costs.

In some examples, configurations of the present disclosure can drive the haptic actuator 124 with force detection driving signals that produce vibrations in the touch surface 144 that are substantially imperceptible to a user touching the touch surface. In some examples, such force detection driving signals have a frequency less than approximately 50 Hz. and greater than approximately 500 Hz. Accordingly at 220, method 200 can include driving the haptic actuator 124 with a force detection driving signal having a frequency outside of a range between approximately 50 Hz. and approximately 500 Hz. In this example and in another potential advantage of the present disclosure, utilizing a force detection driving signal having a frequency outside of the range between approximately 50 Hz. and approximately 500 Hz. can enable the computing device 100 to determine the force of a users' touch input on the touch surface 144 of the trackpad 120 in the background and without potentially disturbing the user's interactions with the trackpad. In other examples that utilize different mechanical designs, lower voltages, and/or short signal bursts driving the haptic actuator, driving signals having frequencies within the range between approximately 50 Hz. and approximately 500 Hz. can be utilized while still producing vibrations in the touch surface that are substantially imperceptible to a user. For example, in some cases driving signals less than approximately 100 Hz. and greater than approximately 300 Hz. can be utilized while still producing vibrations in the touch surface that are substantially imperceptible to a user.

In other examples, configurations of the present disclosure can drive the haptic actuator 124 with force detection driving signals that produce perceptible vibrations in the touch surface 144. In some examples, such force detection driving signals have a frequency within a range between approximately 100 Hz. and approximately 300 Hz. Accordingly at 224, method 200 can include driving the haptic actuator 124 with a force detection driving signal having a frequency within a range between approximately 100 Hz. and approximately 300 Hz. In other examples that utilize different mechanical designs and/or higher voltages driving the haptic actuator, driving signals having frequencies outside the range between approximately 100 Hz. and approximately 300 Hz. can be utilized while still producing perceptible vibrations in the touch surface. In one potential advantage of this configuration, user input devices that utilize a force detection driving signal that produces perceptible vibrations in a touch surface on the device can utilize such vibrations with aspects of an application or user experience. For example, a gaming application can utilize input device vibrations as part of a gaming experience. In another example, a medical application that receives input from a robotic joystick can utilize such input device vibrations to simulate travel of a remote device through a human body.

In some examples of the present disclosure, the size of a touch input on a touch surface can be utilized along with the acceleration of the touch surface to determine the force of the touch input on the touch surface of the user input device. In some examples, touch detection algorithms 132 are configured to determine a contact area of a touch input. For example, a larger contact area of a larger finger reduces the acceleration magnitude of the touch surface for a given touch force as compared to a smaller contact area of a smaller finger for the same contact force. Accordingly, at 228 method 200 includes determining a size of the touch input on the touch surface. At 232 method 200 includes using at least the size and the acceleration to determine the force of the touch input on the touch surface of the user input device. In some of these examples, the haptic force determination algorithms 134 can utilize a plurality of look-up tables that each correspond to different contact area sizes and map a plurality of acceleration values to corresponding forces of a touch input. In other examples, one or more linear equations incorporate contact size factors to determine the force of a touch input.

In one example, for a single finger touch contact that creates an 8 mm. diameter contact area and generates a force of 150 grams on the touch surface 144, the peak acceleration of the touch surface is 6.4 G. For another single finger touch contact that creates a 15 mm. diameter contact area and also generates a force of 150 grams on the touch surface 144, the peak acceleration of the touch surface is approximately 10% lower, or 5.8 G, as compared to the 8 mm. finger.

Further, as the force applied by a touch input increases, the reduction in touch surface acceleration also increases for larger contact areas. In one example, for the single 8 mm. diameter touch contact area that generates a force of 350 grams on the touch surface 144, the peak acceleration of the touch surface is 3.8 G. For the single 15 mm. diameter touch contact area that also generate 350 grams of force, the peak acceleration of the touch surface is approximately 25% lower, or 2.9 G, as compared to the 8 mm. finger. Accordingly, and in another potential advantage of the present disclosure, by also taking into consideration the size of a touch input on a touch surface along with the acceleration of the touch surface, configurations of the present disclosure can determine the force of the touch input on the touch surface of the user input device with greater accuracy.

As noted above, in the present example haptic feedback algorithms 136 are executable to drive the haptic actuator 124 with a haptic feedback driving signal for providing haptic feedback to one or more fingers or other body part of a user contacting the touch surface 144. In some examples, and in another potential advantage of the present disclosure, the haptic feedback driving signal causes a haptic feedback acceleration in the touch surface 144 that is greater than the force determination acceleration generated by the force detection driving signal to thereby provide distinctive haptic feedback that is easily recognized by a user. Accordingly and with reference now to FIG. 5B, at 236 the method 200 includes, wherein the acceleration is a first acceleration, driving the haptic actuator with a haptic feedback driving signal that causes a second acceleration in the touch surface greater than the first acceleration generated by the force detection driving signal.

In some examples, haptic feedback is triggered when a touch input exceeds a haptic threshold, thereby alerting a user that an input has been received via touch surface 144. Accordingly and at 240 method 200 includes determining that the force of the touch input exceeds a haptic threshold. At 244 the method 200 includes, based at least in part on determining that the force of the touch input exceeds the haptic threshold, driving the haptic actuator with the haptic feedback driving signal. In one potential advantage of this feature, triggering haptic feedback when the force of a touch input exceeds a haptic threshold alerts a user that the user's touch input is received by the computing device.

In some examples, configurations of the present disclosure can alternate between determining the force of a touch input on the touch surface 144 and providing haptic feedback to the user. Advantageously, in these examples the computing device can provide haptic feedback while continuing to monitor the magnitude of force exerted on the touch surface 144. Accordingly and at 248 method 200 includes, wherein the acceleration is a first acceleration, alternating between driving the haptic actuator 124 with the force detection driving signal and driving the haptic actuator with a haptic feedback driving signal that causes a second acceleration in the touch surface 144 greater than the first acceleration.

In some examples a user can apply two or more touch contacts to the touch surface 144. For example, in different multi-touch applications a user can press one finger in a first location and a second finger in a second location on the touch surface 144. However, in some examples a user can have no intention to provide a second touch input, but nevertheless can contact the touch surface 144 with a second touch contact, such as resting another finger or palm of a hand on the touch surface. In these situations, the user is not applying an intended force with her second touch contact, and accordingly does not desire this second contact to be processed by the computing device as an intended input.

In these use case situations and in some examples, configurations of the present disclosure utilize measured accelerations of the touch surface as described above to determine or assist in determining that the second touch input is not applying an intended force on the touch surface of the user input device. For example, in configurations of trackpads that also include discrete force sensor(s), such as one or more strain gauges or capacitive force sensors, a first touch input at a first location on the touch surface can be received and a corresponding first acceleration of the touch surface measured and utilized to determine a first force of the touch input on the touch surface as described above. In one example, the first touch input is the user pressing her finger on the touch surface to select a displayed icon, the first acceleration is measured to be 6.4 G, and the first force is determined to be 150 grams as described above.

With reference again to FIG. 5B, in this example at 252 method 200 includes receiving a second touch input from a second location on the touch surface 144 of the trackpad 120. In the present example, the second touch input is the user passively resting her palm on the touch surface while providing the intended first touch input with her finger. At 256 method 200 includes driving the haptic actuator 124 with the force detection driving signal to cause a second acceleration in the touch surface 144. At 260 method 200 includes measuring the second acceleration using a signal from the accelerometer. In this example the second acceleration is measured to be approximately the same 6.4 G as the first acceleration (or in other examples within a predetermined range of the first acceleration, such as +/−1.0%). Accordingly, because the second acceleration is approximately the same as the first acceleration, the haptic force determination algorithms 134 can determine that the second contact is not applying supplemental force in addition to the first force applied by the first contact, and therefore the user does not desire the second touch input to be processed as an intended user input.

Accordingly, and at 264 method 200 includes, based at least on comparing the first acceleration to the second acceleration, determining that the second touch input is not applying an intended force on the touch surface of the user input device. Advantageously, in these examples configurations of the present disclosure can be utilized to determine or assist in determining that a second touch input is not applying an intended force on the touch surface of the user input device. For example, where a trackpad includes optional discrete force sensor(s) that can estimate forces applied by one or more touch contacts, these configurations of the present disclosure can increase the confidence/reliability of determinations that the second touch input is not applying an intended force on the touch surface.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
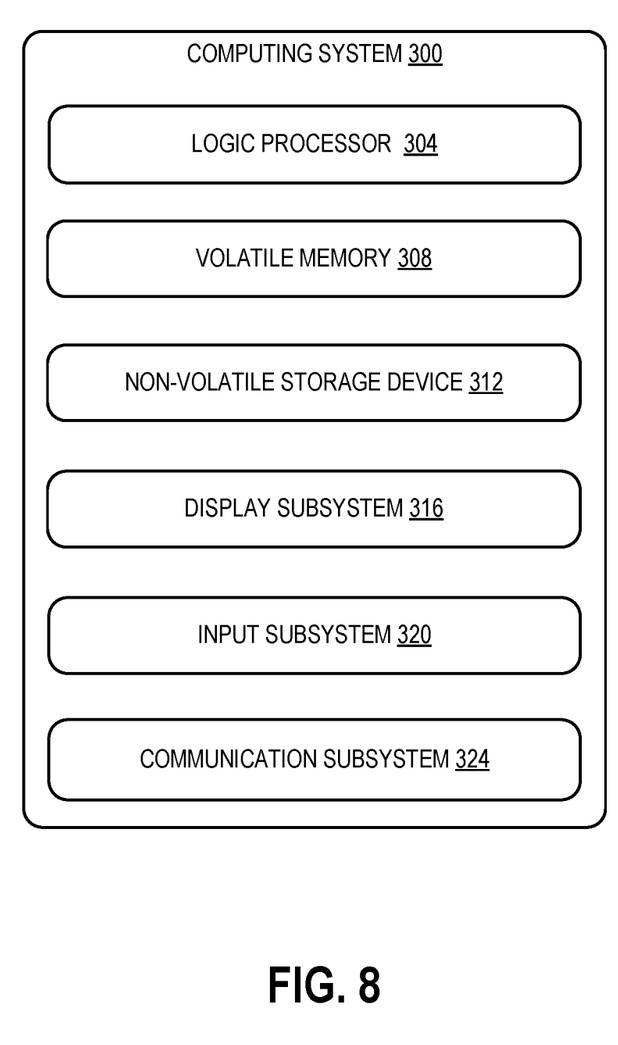
FIG. 8 shows a block diagram of an example computing system according to examples of the present disclosure.

FIG. 8 schematically shows a simplified representation of a computing system 300 configured to provide any to all of the compute functionality described herein. Computing system 300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. The computing device 100 described above may comprise computing system 300 or one or more aspects of computing system 300.

Computing system 300 includes a logic processor 304, volatile memory 308, and a non-volatile storage device 312. Computing system 300 may optionally include a display subsystem 316, input subsystem 320, communication subsystem 324, and/or other components not shown in FIG. 8.

Logic processor 304 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 304 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 304 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 312 includes one or more physical devices configured to hold instructions executable by the logic processors to implement the methods and processes described herein. When such methods and processes are implemented, the state of non-volatile storage device 312 may be transformed—e.g., to hold different data.

Non-volatile storage device 312 may include physical devices that are removable and/or built-in. Non-volatile storage device 312 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 312 may include nonvolatile, dynamic, static, read/write, read-only, sequential-access, location-addressable, file-addressable, and/or content-addressable devices. It will be appreciated that non-volatile storage device 312 is configured to hold instructions even when power is cut to the non-volatile storage device 312.

Volatile memory 308 may include physical devices that include random access memory. Volatile memory 308 is typically utilized by logic processor 304 to temporarily store information during processing of software instructions. It will be appreciated that volatile memory 308 typically does not continue to store instructions when power is cut to the volatile memory 308.

Aspects of logic processor 304, volatile memory 308, and non-volatile storage device 312 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), microcontroller units (MCUs), and complex programmable logic devices (CPLDs), for example.

When included, display subsystem 316 may be used to present a visual representation of data held by non-volatile storage device 312. As the herein described methods and processes change the data held by the non-volatile storage device, and thus transform the state of the non-volatile storage device, the state of display subsystem 316 may likewise be transformed to visually represent changes in the underlying data. Display subsystem 316 may include one or more display devices utilizing virtually any type of technology. Such display devices may be combined with logic processor 304, volatile memory 308, and/or non-volatile storage device 312 in a shared enclosure, or such display devices may be peripheral display devices.

When included, input subsystem 320 may comprise or interface with one or more user-input devices such as a stylus, trackpad 120, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 324 may be configured to communicatively couple various computing devices described herein with each other, and with other devices. Communication subsystem 324 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a computing device, comprising: a user input device comprising: a touch surface; a haptic actuator coupled to the touch surface; and an accelerometer coupled to the touch surface; a processor; and a memory storing instructions executable by the processor to: receive a touch input from the touch surface of the user input device; drive the haptic actuator with a force detection driving signal to cause an acceleration in the touch surface; measure the acceleration using a signal from the accelerometer; and use at least the acceleration to determine a force of the touch input on the touch surface of the user input device. The computing device may additionally or alternatively include, wherein the force detection driving signal has a frequency outside of a range between approximately 50 Hz. and approximately 500 Hz. The computing device may additionally or alternatively include, wherein the force detection driving signal has a frequency within a range between approximately 100 Hz. and approximately 300 Hz. The computing device may additionally or alternatively include, wherein the acceleration is a first acceleration, and the instructions are executable to drive the haptic actuator with a haptic feedback driving signal that causes a second acceleration in the touch surface greater than the first acceleration. The computing device may additionally or alternatively include, wherein the instructions are executable to: determine that the force of the touch input exceeds a haptic threshold; and based at least in part on determining that the force of the touch input exceeds the haptic threshold, drive the haptic actuator with the haptic feedback driving signal. The computing device may additionally or alternatively include, wherein the acceleration is a first acceleration, and the instructions are executable to alternate between driving the haptic actuator with the force detection driving signal and driving the haptic actuator with a haptic feedback driving signal that causes a second acceleration in the touch surface greater than the first acceleration. The computing device may additionally or alternatively include, wherein the instructions are executable to: determine a size of the touch input on the touch surface; and use at least the size and the acceleration to determine the force of the touch input on the touch surface of the user input device. The computing device may additionally or alternatively include, wherein the user input device is a trackpad. The computing device may additionally or alternatively include, wherein the touch input is a first touch input received from a first location on the touch surface of the user input device and the acceleration is a first acceleration, and the instructions are executable to: receive a second touch input from a second location on the touch surface of the user input device; drive the haptic actuator with the force detection driving signal to cause a second acceleration in the touch surface; measure the second acceleration using a signal from the accelerometer; and based at least on comparing the first acceleration to the second acceleration, determine that the second touch input is not applying an intended force on the touch surface of the user input device.

Another aspect provides, at a computing device, a method for determining a force of a touch input on a touch surface of a user input device comprising an accelerometer, the method comprising: receiving a touch input from the touch surface of the user input device; driving a haptic actuator with a force detection driving signal to cause an acceleration in the touch surface; measuring the acceleration using a signal from the accelerometer; and using at least the acceleration to determine the force of the touch input on the touch surface of the user input device. The method may additionally or alternatively include, wherein the force detection driving signal has a frequency outside of a range between approximately 50 Hz. and approximately 500 Hz. The method may additionally or alternatively include, wherein the force detection driving signal has a frequency within a range between approximately 100 Hz. and approximately 300 Hz. The method may additionally or alternatively include, wherein the acceleration is a first acceleration, and the method comprises driving the haptic actuator with a haptic feedback driving signal that causes a second acceleration in the touch surface greater than the first acceleration. The method may additionally or alternatively include determining that the force of the touch input exceeds a haptic threshold; and based at least in part on determining that the force of the touch input exceeds the haptic threshold, driving the haptic actuator with the haptic feedback driving signal. The method may additionally or alternatively include, wherein the acceleration is a first acceleration, and the method comprises alternating between driving the haptic actuator with the force detection driving signal and driving the haptic actuator with a haptic feedback driving signal that causes a second acceleration in the touch surface greater than the first acceleration. The method may additionally or alternatively include determining a size of the touch input on the touch surface; and using at least the size and the acceleration to determine the force of the touch input on the touch surface of the user input device. The method may additionally or alternatively include, wherein the user input device is a trackpad. The method may additionally or alternatively include, wherein the touch input is a first touch input received from a first location on the touch surface of the user input device and the acceleration is a first acceleration, receiving a second touch input from a second location on the touch surface of the user input device; driving the haptic actuator with the force detection driving signal to cause a second acceleration in the touch surface; measuring the second acceleration using a signal from the accelerometer; and based at least on comparing the first acceleration to the second acceleration, determining that the second touch input is not applying an intended force on the touch surface of the user input device.

Another aspect provides a computing device, comprising: a trackpad comprising a touch surface and a printed circuit board; an accelerometer affixed to the printed circuit board; a haptic actuator coupled to the trackpad; a processor; and a memory storing instructions executable by the processor to: receive a touch input from the touch surface of the trackpad; determine a size of the touch input on the touch surface; drive the haptic actuator with a force detection driving signal to cause an acceleration in the trackpad; measure the acceleration using a signal from the accelerometer; and use at least the size of the touch input and the acceleration to determine a force of the touch input on the touch surface of the trackpad. The computing device may additionally or alternatively include, wherein the acceleration is a first acceleration, and the instructions are executable to drive the haptic actuator with a haptic feedback driving signal that causes a second acceleration greater than the first acceleration.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, the computing device comprising:
   a user input device comprising:
      a touch surface;
      a haptic actuator coupled to the touch surface; and
      an accelerometer coupled to the touch surface;
   a processor; and
   a memory storing instructions executable by the processor to:
      receive a touch input from the touch surface of the user input device;
      drive the haptic actuator with a force detection driving signal to cause a first acceleration in the touch surface;
      measure the first acceleration using a signal from the accelerometer;
      use at least the first acceleration to determine a force of the touch input on the touch surface of the user input device; and
      alternate between driving the haptic actuator with the force detection driving signal and driving the haptic actuator with a haptic feedback driving signal that causes a second acceleration in the touch surface greater than the first acceleration.

2. The computing device of claim 1, wherein the force detection driving signal has a frequency outside of a range between approximately 50 Hz. and approximately 500 Hz.

3. The computing device of claim 1, wherein the force detection driving signal has a frequency within a range between approximately 100 Hz. and approximately 300 Hz.

4. The computing device of claim 1, wherein the instructions are executable to:
   determine that the force of the touch input exceeds a haptic threshold; and
   based at least in part on determining that the force of the touch input exceeds the haptic threshold, drive the haptic actuator with the haptic feedback driving signal.

5. The computing device of claim 1, wherein the instructions are executable to:
   determine a size of the touch input on the touch surface; and
   use at least the size and the first acceleration to determine the force of the touch input on the touch surface of the user input device.

6. The computing device of claim 1, wherein the user input device is a trackpad.

7. The computing device of claim 1, wherein the touch input is a first touch input received from a first location on the touch surface of the user input device, and the instructions are executable to:
   receive a second touch input from a second location on the touch surface of the user input device;
   drive the haptic actuator with the force detection driving signal to cause a third acceleration in the touch surface;
   measure the third acceleration using a signal from the accelerometer; and
   based at least on comparing the first acceleration to the third acceleration, determine that the second touch input is not applying an intended force on the touch surface of the user input device.

8. The computing device of claim 1, wherein the instructions are executable to:
   map the first acceleration to the force of the touch input using a look-up-table; or
   translate the first acceleration to the force of the touch input using one or more linear equations; or
   map the first acceleration to the force of the touch input using a machine learning algorithm.

9. At a computing device, a method for determining a force of a touch input on a touch surface of a user input device comprising an accelerometer, the method comprising:

receiving a touch input from the touch surface of the user input device;
driving a haptic actuator with a force detection driving signal to cause a first acceleration in the touch surface;
measuring the first acceleration using a signal from the accelerometer; and
using at least the first acceleration to determine the force of the touch input on the touch surface of the user input device; and
alternating between driving the haptic actuator with the force detection driving signal and driving the haptic actuator with a haptic feedback driving signal that causes a second acceleration in the touch surface greater than the first acceleration.

10. The method of claim 9, wherein the force detection driving signal has a frequency outside of a range between approximately 50 Hz. and approximately 500 Hz.

11. The method of claim 9, wherein the force detection driving signal has a frequency within a range between approximately 100 Hz. and approximately 300 Hz.

12. The method of claim 9, further comprising:
determining that the force of the touch input exceeds a haptic threshold; and
based at least in part on determining that the force of the touch input exceeds the haptic threshold, driving the haptic actuator with the haptic feedback driving signal.

13. The method of claim 9, further comprising:
determining a size of the touch input on the touch surface; and
using at least the size and the first acceleration to determine the force of the touch input on the touch surface of the user input device.

14. The method of claim 9, wherein the user input device is a trackpad.

15. The method of claim 9, wherein the touch input is a first touch input received from a first location on the touch surface of the user input device, the method further comprising:
receiving a second touch input from a second location on the touch surface of the user input device;
driving the haptic actuator with the force detection driving signal to cause a third acceleration in the touch surface;
measuring the third acceleration using a signal from the accelerometer; and
based at least on comparing the first acceleration to the third acceleration, determining that the second touch input is not applying an intended force on the touch surface of the user input device.

16. A computing device, comprising:
a trackpad comprising a touch surface and a printed circuit board;
an accelerometer affixed to the printed circuit board;
a haptic actuator coupled to the trackpad;
a processor; and
a memory storing instructions executable by the processor to:
receive a touch input from the touch surface of the trackpad;
determine a size of the touch input on the touch surface;
drive the haptic actuator with a force detection driving signal to cause a first acceleration in the trackpad;
measure the first acceleration using a signal from the accelerometer;
use at least the size of the touch input and the first acceleration to determine a force of the touch input on the touch surface of the trackpad and
alternate between driving the haptic actuator with the force detection driving signal and driving the haptic actuator with a haptic feedback driving signal that causes a second acceleration in the touch surface greater than the first acceleration.

17. The computing device of claim 16, wherein the instructions are executable to:
determine that the force of the touch input exceeds a haptic threshold; and
based at least in part on determining that the force of the touch input exceeds the haptic threshold, drive the haptic actuator with the haptic feedback driving signal.

18. The computing device of claim 16, wherein the touch input is a first touch input received from a first location on the touch surface of the trackpad, and the instructions are executable to:
receive a second touch input from a second location on the touch surface of the trackpad;
drive the haptic actuator with the force detection driving signal to cause a third acceleration in the touch surface;
measure the third acceleration using a signal from the accelerometer; and
based at least on comparing the first acceleration to the third acceleration, determine that the second touch input is not applying an intended force on the touch surface of the trackpad.

19. The computing device of claim 16, wherein the force detection driving signal has a frequency outside of a range between approximately 50 Hz. and approximately 500 Hz.

20. The computing device of claim 16, wherein the force detection driving signal has a frequency within a range between approximately 100 Hz. and approximately 300 Hz.

* * * * *